US012021327B2

(12) United States Patent
Feng et al.

(10) Patent No.: US 12,021,327 B2
(45) Date of Patent: Jun. 25, 2024

(54) SIGNAL OUTLET ASSEMBLY WITH SHIELDING WIRE GROUNDED TO SIDEWALL OF THE HOUSING

(71) Applicant: Siemens Aktiengesellschaft, Munich (DE)

(72) Inventors: Hai Qiao Feng, Nanjing (CN); Xiao Hui Zhang, Nanjing (CN); Guo Qing Huang, Nanjing (CN); Jian Wen Yang, Nanjing (CN); Wen Qi Zhang, Nanjing (CN); Qi Wu, Nanjing (CN); Qing Song Tang, Nanjing (CN); Yi Yin Yao, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 246 days.

(21) Appl. No.: 17/770,473

(22) PCT Filed: Oct. 16, 2020

(86) PCT No.: PCT/EP2020/079180
§ 371 (c)(1),
(2) Date: Apr. 20, 2022

(87) PCT Pub. No.: WO2021/078642
PCT Pub. Date: Apr. 29, 2021

(65) Prior Publication Data
US 2022/0384988 A1    Dec. 1, 2022

(30) Foreign Application Priority Data

Oct. 21, 2019  (CN) .......................... 201911001759.0

(51) Int. Cl.
*H01R 13/58* (2006.01)
*H01R 12/59* (2011.01)
(Continued)

(52) U.S. Cl.
CPC ....... *H01R 13/5808* (2013.01); *H01R 12/596* (2013.01); *H01R 13/5205* (2013.01); *H01R 13/65914* (2020.08); *H01R 13/5816* (2013.01)

(58) Field of Classification Search
CPC .............. H01R 13/5808; H01R 12/596; H01R 13/5205; H01R 13/65914; H01R 13/5816;
(Continued)

(56) References Cited

U.S. PATENT DOCUMENTS

| 4,514,029 A | 4/1985 | Lax et al. ................ 439/607.47 |
| 6,784,368 B2 | 8/2004 | Imai ................................ 174/74 |
| 2011/0151713 A1 | 6/2011 | Yang ............................. 439/578 |

(Continued)

FOREIGN PATENT DOCUMENTS

| CN | 236 09 50 | 1/2000 | ............. H01R 11/00 |
| CN | 102 647 042 | 8/2012 | ............... H02K 5/22 |

(Continued)

OTHER PUBLICATIONS

Chinese Office Action, Application No. 202080070393.7, 7 pages, dated Jun. 30, 2023.
(Continued)

*Primary Examiner* — Travis S Chambers
(74) *Attorney, Agent, or Firm* — Slayden Grubert Beard PLLC (57) ABSTRACT

Various embodiments of the teachings herein include a signal cable connection device comprising: a cable with a sleeve and multiple loose wires extending out from an extremity of the sleeve; a conductive metal ring crimped at the extremity so the ring and the sleeve are fixed to each other, one end of the conductive metal ring having an outward-turned flange, and a shielding wire connected to the conductive metal ring; and a housing with a cable channel defining an outer opening located at an outer side of the housing and an inner opening located at an inner side of the (Continued)

housing, and a threaded hole at an edge of the inner opening. When a screw is screwed into the threaded hole, the outward-turned flange of the conductive metal ring is clamped between a head of the screw and a sidewall of the inner opening.

10 Claims, 5 Drawing Sheets

(51) Int. Cl.
*H01R 13/52* (2006.01)
*H01R 13/6591* (2011.01)

(58) Field of Classification Search
CPC ...... H01R 13/648; H01R 13/58; H01R 31/06; H02G 15/105; H02G 3/0641
See application file for complete search history.

(56) References Cited

U.S. PATENT DOCUMENTS

2012/0315790 A1* 12/2012 Hein .................. H01R 13/5812
439/574
2018/0351304 A1 12/2018 Miyazawa et al.
2018/0375232 A1 12/2018 Wu .......................... H01R 9/03
2020/0212620 A1* 7/2020 Takahashi ............ H01R 13/748
2022/0094115 A1* 3/2022 Nozawa ............. H01R 13/6591

FOREIGN PATENT DOCUMENTS

| CN | 104 993 315 | 10/2015 | ........... H01R 13/648 |
| CN | 108963540 A | 12/2018 | ........... H01R 13/502 |
| CN | 108987991 A | 12/2018 | ............. H01R 13/02 |
| CN | 109 119 812 | 1/2019 | ........... H01R 13/516 |
| CN | 109 217 571 | 1/2019 | ........... H02K 11/215 |
| CN | 109149280 A | 1/2019 | ......... H01R 13/6581 |
| CN | 208849173 U | 5/2019 | ........... H01R 13/502 |
| EP | 0093992 A1 | 11/1983 | ........... H01R 13/648 |
| JP | 2003 217697 | 7/2003 | ............... H01R 4/18 |

OTHER PUBLICATIONS

Search Report for International Application No. PCT/EP2020/079180, 2 pages, dated Feb. 1, 2021.

* cited by examiner

SIGNAL OUTLET ASSEMBLY WITH SHIELDING WIRE GROUNDED TO SIDEWALL OF THE HOUSING

CROSS-REFERENCE TO RELATED APPLICATIONS

This application is a U.S. National Stage Application of International Application No. PCT/EP2020/079180 filed Oct. 16, 2020, which designates the United States of America, and claims priority to CN Application No. 201911001759.0 filed Oct. 21, 2019, the contents of which are hereby incorporated by reference in their entirety.

TECHNICAL FIELD

The present disclosure relates to motion control. Various embodiments of the teachings herein include signal cable connection devices and/or electric machine assemblies using a signal cable connection device.

BACKGROUND

An electric machine is typically connected to an encoder by a signal cable. A signal cable assembly in the prior art generally consists of a rubber sheath, a plastic nut, a plastic cover, a ground terminal, and a cable enclosed in a shielding layer at a position of loose wires. In some application environments, such a signal cable connection will sometimes suffer momentary signal interruption or some other poor signal connection.

SUMMARY

The present disclosure teaches various signal cable connection devices. For example, some embodiments of the teachings herein include a signal cable connection device comprising: a cable (10), including a sleeve (11) and multiple loose wires (12) enclosed in the sleeve, the multiple loose wires extending out from an extremity of the sleeve; a conductive metal ring (20, 20')/crimped at the extremity of the sleeve so that the conductive metal ring and the sleeve are fixed to each other, one end of the conductive metal ring having an outward-turned flange (21, 21'), and a shielding wire in the multiple loose wires being connected to the conductive metal ring; and a housing (30), the housing being provided with a cable channel (31) allowing the cable to pass through, the cable channel comprising an outer opening (311) located at an outer side of the housing and an inner opening (312) located at an inner side of the housing, and a threaded hole being provided at an edge of the inner opening, wherein, when a screw (50) is screwed into the threaded hole, the outward-turned flange of the conductive metal ring will be clamped between a head of the screw and a sidewall of the inner opening.

In some embodiments, extremities of the multiple loose wires (12) are connected to a connector (60), the connector being adapted to be connected to an encoder.

In some embodiments, the conductive metal ring (20, 20') is fitted round the outside of the extremity of the sleeve (11, 11') and fixed thereto by crimping, the conductive metal ring is fixed in a cable channel (31) of the housing (30), a first end of the conductive metal ring abuts the outer opening (311) of the housing, and the outward-turned flange (21, 21') is located at a second end opposite the first end.

In some embodiments, the device further comprises an O-ring (40), the O-ring being clamped between the outer opening (311) of the housing (30) and the first end of the conductive metal ring (20, 20').

In some embodiments, the O-ring (40) is made of an elastic material, to improve sealing between the cable (10) and the outer opening (311) of the housing (30).

In some embodiments, a part of the shielding wire (13, 13') which extends out from the extremity of the sleeve (11, 11') is connected to an inner wall of the conductive metal ring (20, 20') by back-pressing.

In some embodiments, a first end of the conductive metal ring (20, 20') is inserted into the extremity of the sleeve (11, 11'), and the outward-turned flange (21, 21') located at a second end of the conductive metal ring abuts the extremity of the sleeve.

In some embodiments, an inward-cut chamfer (22') is provided at the first end of the conductive metal ring (20, 20').

In some embodiments, the shielding wire (13, 13') is welded to the outward-turned flange (21, 21') of the conductive metal ring (20, 20'). 10. An electric machine assembly, comprising: an electric machine, an encoder and a signal cable, the electric machine and the encoder being signal-connected via the signal cable, wherein the signal cable has a signal cable connection device as described herein, the signal cable being connected to a signal interface on the encoder by means of the signal cable connection device.

BRIEF DESCRIPTION OF THE DRAWINGS

The drawings are included to provide further understanding of the teachings of the present disclosure. They are recorded and form part of the present application. The drawings show example embodiments and together with this specification serve the function of explaining the principles of the present disclosure. In the drawings.

DETAILED DESCRIPTION

The abovementioned connection problems in the prior art have the following two principal causes: (1) the length of the signal cable inside the electric machine is too short, so in the process of the cable being twisted tight or when it is pulled by an external force, the connection device will be subjected to a corresponding turning force or tensile stress; and/or (2) when the signal cable connection device is fitted onto the electric machine, due to the fact that the loose wires of the connection device are enclosed in aluminum foil (which is used to block electromagnetic interference), the aluminum foil causes the cable to change from being flexible to being rigid at this position, thus stress at this position will be transmitted to the cable connection device in the process of the cable being locked.

The structure of the signal cable connection devices incorporating teachings of the present disclosure is simpler, having dispensed with the rubber sheath, ground terminal, aluminum foil, and plastic nut, etc. that are used in the prior art, and can increase both the pulling resistance and water resistance of the signal cable connection device while guaranteeing the ability to block electromagnetic interference.

In some embodiments, a signal cable connection device comprises: a cable, including a sleeve and multiple loose wires enclosed in the sleeve, the multiple loose wires extending out from an extremity of the sleeve; a conductive metal ring, crimped at the extremity of the sleeve so that the conductive metal ring and the sleeve are fixed to each other, one end of the conductive metal ring having an outward-turned flange, and a shielding wire in the multiple loose wires being connected to the conductive metal ring; a housing, the housing being provided with a cable channel allowing the cable to pass through, the cable channel comprising an outer opening located at an outer side of the housing and an inner opening located at an inner side of the housing, and a threaded hole being provided at an edge of the inner opening, wherein, when a screw is screwed into the threaded hole, the outward-turned flange of the conductive metal ring will be clamped between a head of the screw and a sidewall of the inner opening.

In some embodiments, in the signal cable connection device described above, extremities of the multiple loose wires are connected to a connector, the connector being adapted to be connected to an encoder.

In some embodiments, the conductive metal ring is fitted round the outside of the extremity of the sleeve and fixed thereto by crimping, the conductive metal ring is fixed in a cable channel of the housing, a first end of the conductive metal ring abuts the outer opening of the housing, and the outward-turned flange is located at a second end opposite the first end.

In some embodiments, the device further comprises an O-ring, the O-ring being clamped between the outer opening of the housing and the first end of the conductive metal ring.

In some embodiments, the O-ring is made of an elastic material, to improve sealing between the cable and the outer opening of the housing.

In some embodiments, a part of the shielding wire which extends out from the extremity of the sleeve is connected to an inner wall of the conductive metal ring by back-pressing. Thus, in the process of crimping the conductive metal ring to the sleeve, the shielding wire can be clamped too.

In some embodiments, a first end of the conductive metal ring is inserted into the extremity of the sleeve, and the outward-turned flange located at a second end of the conductive metal ring abuts the extremity of the sleeve, in order to reduce the number of assembly operation steps through a simpler structural design.

In some embodiments, an inward-cut chamfer is provided at the first end of the conductive metal ring. The inward-cut chamfer facilitates the insertion of the conductive metal ring into the extremity of the sleeve.

In some embodiments, the shielding wire is welded to the outward-turned flange of the conductive metal ring.

As another example, some embodiments of the teachings herein include an electric machine assembly comprising: an electric machine, an encoder, and a signal cable, the electric machine and the encoder being signal-connected via the signal cable, wherein the signal cable has the signal cable connection device as described above, the signal cable being connected to a signal interface on the encoder by means of the signal cable connection device.

It should be understood that both the general description of the various embodiments of the present disclosure above and the detailed description thereof below are exemplary and illustrative, and are intended to provide further explanation without limiting the scope of the present disclosure.

KEY TO REFERENCE LABELS 10 cable
20, 20' conductive metal ring
30 housing
40 O-ring
50 screw
60 connector
11, 11' sleeve
12 loose wires
13, 13' shielding wire
21, 21' outward-turned flange
22 chamfer
31 cable channel
311 outer opening
312 inner opening
51 head Embodiments of the present disclosure are now described by referring to the drawings in detail and examples thereof are shown in the drawings. Wherever possible, identical labels are used to indicate identical or similar parts in all the drawings. In addition, although the terms used in the present disclosure are selected from well-known terms in public use, some terms mentioned herein might be selected by the applicant according to his or her judgment, and the detailed meanings thereof are explained in relevant parts of the description herein. In addition, the present disclosure must be interpreted not only through the actual terms used, but also through the meaning implied in each term.

Figure 1:
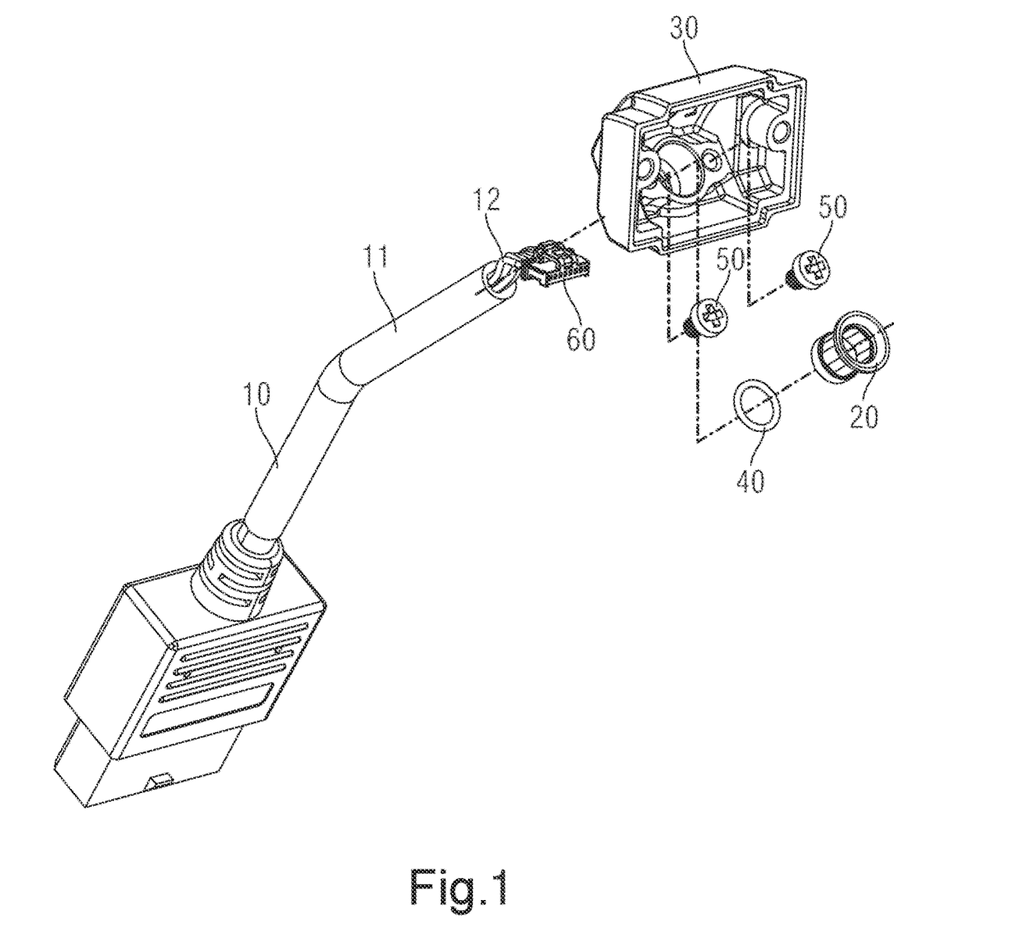
FIG. 1 shows an exploded view of a signal cable connection device incorporating teachings of the present disclosure.
Figure 2:
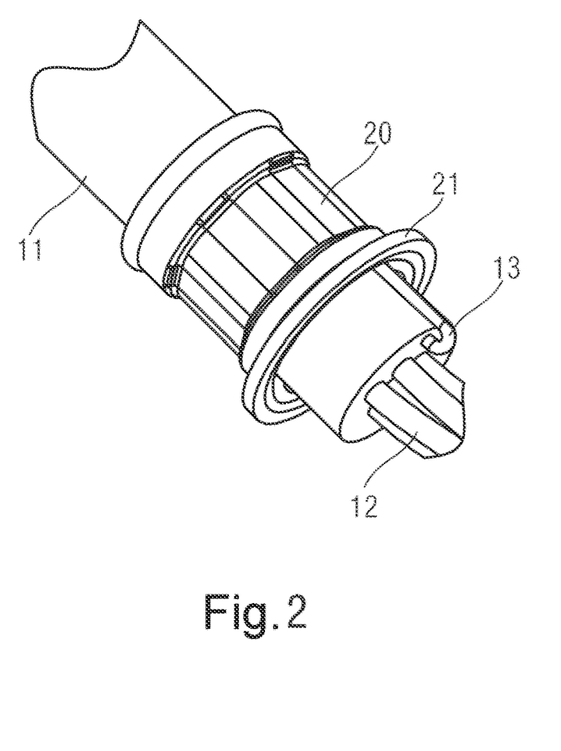
FIG. 2 shows a schematic drawing of an embodiment of an assembled state of a conductive metal ring incorporating teachings of the present disclosure.
Figure 3:
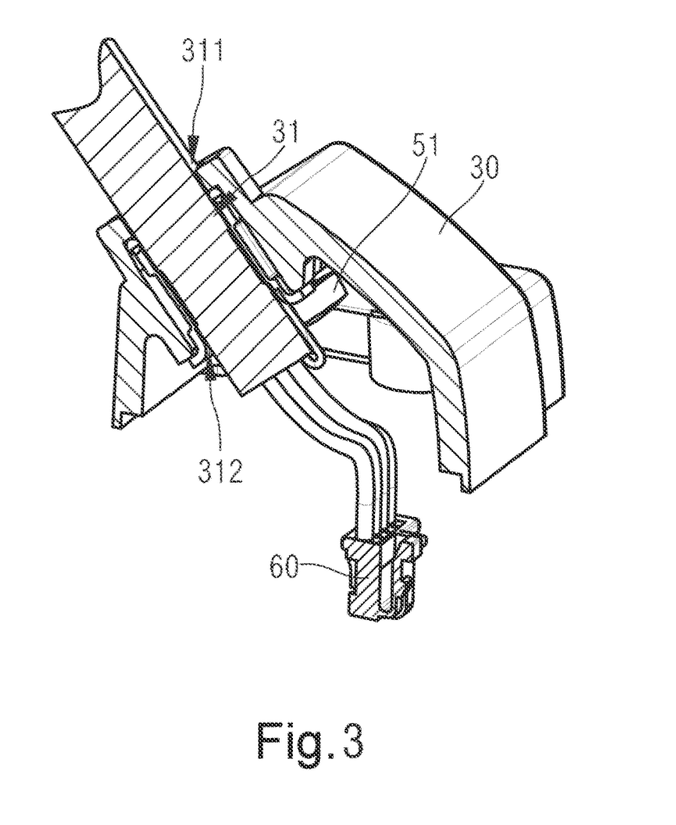
FIG. 3 shows a sectional view of the first embodiment shown in FIG. 1.

A first example embodiment of a signal cable connection device incorporating teachings of the present disclosure is discussed in conjunction with FIGS. 1-3. In this embodiment, the signal cable connection device comprises: a cable 10, a conductive metal ring 20, and a housing 30. In some embodiments, the housing 30 comprises a metal. A metal housing may help to improve electromagnetic shielding.

The cable 10 includes a sleeve 11 and multiple loose wires 12. The loose wires 12 are enclosed in the sleeve 11. At least one shielding wire 13 is also included in the loose wires 12. The multiple loose wires 12 extend out from an extremity of the sleeve 11, as shown in FIG. 1. Extremities of the multiple loose wires 12 are connected to a connector 60; the connector 60 is adapted to be connected to an encoder (specifically, a port on the encoder). Of course, the connector 60 of the present invention may also be designed to be connected to a port on an electric machine (not shown), or may also be used for connecting to another port, either already known or yet to be developed, on another device.

In the embodiment shown in FIG. 2, the conductive metal ring 20 is first fitted round the outside of the cable 10, and then crimped at the extremity of the sleeve 11 of the cable 10, so that the conductive metal ring 20 and sleeve 11 are fixed together, to ensure that the cable 10 cannot easily be pulled out by an external force. One end of the conductive metal ring 20 (the end close to the extremity of the sleeve 11 in the embodiment shown in FIG. 2) is provided with an outward-turned flange 21. The shielding wire 13 in the multiple loose wires 12 is connected to the conductive metal ring 20, to realize the function of blocking electromagnetic interference.

Specifically, in the embodiment shown in FIG. 2, the conductive metal ring 20 is fitted round the outside of the extremity of the sleeve 11, and fixed thereto by crimping. In some embodiments, a part of the shielding wire 13 which extends out from the extremity of the sleeve 11 is connected to an inner wall of the conductive metal ring 20 by backpressing. That is, the shielding wire 13 is fitted inside the conductive metal ring 20. In the process of crimping mentioned above, the shielding wire 13 can be clamped too.

Turning to FIG. 3, the housing 30 is provided with a cable channel 31 which allows the cable to pass through. The cable channel 31 comprises an outer opening 311 located at an outer side of the housing 30 and an inner opening 312 located at an inner side of the housing 30. In an assembled state in the embodiment shown in FIG. 3, the cable 10 and conductive metal ring 20 are together passed through the cable channel 31 of the housing 30, such that the conductive metal ring 20 is fixed in the cable channel 31. The cable channel 31 is designed to be of a size comparable to that of the conductive metal ring 20, so that the two parts fit together tightly. A first end of the conductive metal ring 20 abuts the outer opening 311 of the housing 30, i.e. the first end of the conductive metal ring 20 is limited at the outer opening 311. At the same time, the outward-turned flange 21 is located at a second end opposite the first end.

Furthermore, as shown in FIG. 3, a threaded hole is provided at an edge of the inner opening 312. In particular, when a screw 50 is screwed into the threaded hole, the outward-turned flange 21 of the conductive metal ring 20 will be clamped between a head 51 of the screw 50 and a sidewall of the inner opening 312, thereby securely locking the conductive metal ring 20 in the cable channel 311 of the housing 30.

Based on the above structure, as long as the parts of the loose wires 12 which extend out from the extremity of the sleeve 11 are made long enough, the problem of poor connection which readily occurs in the prior art can be avoided. As an example, when assembly is carried out, the connector 60 is first connected to a corresponding port on the encoder, then the housing is fixed to a casing of the encoder by means of a bolt or another fastener. Thus, since the extremity of the sleeve 11, the conductive metal ring 20 and the housing 30 are fixed together tightly, the cable 10 and the entire signal cable connection device are able to bear a greater external force, increasing the reliability and stability of the product.

In addition, in the first embodiment described above, the signal cable connection device may further comprise an O-ring 40. As shown in FIG. 3, the O-ring 40 is clamped between the outer opening 311 of the housing 30 and the first end of the conductive metal ring 20. The O-ring 40 is designed to fill a gap between the outer opening 311 and the conductive metal ring 20, so that sealing between the cable 10 and the outer opening 311 of the housing 30 at least satisfies the requirements of IP65. In some embodiments, this O-ring 40 is made of an elastic material.

Figure 4:
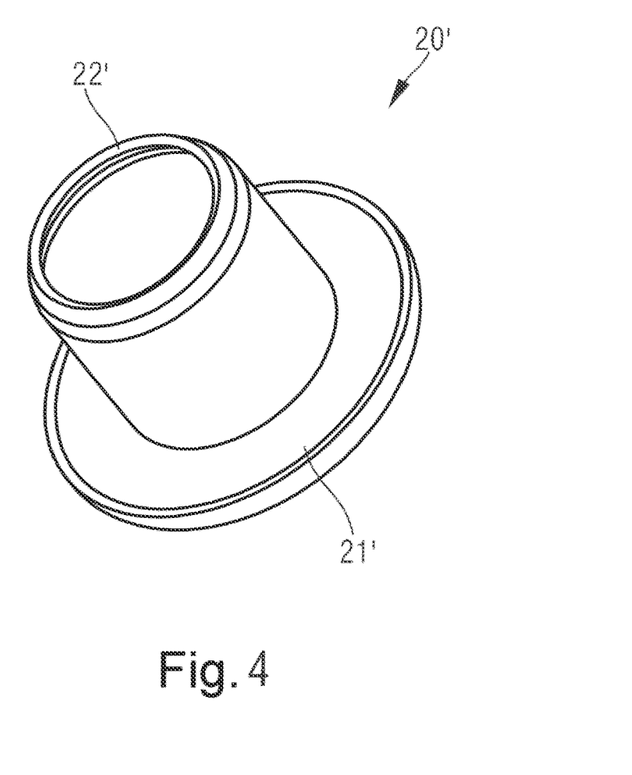
FIG. 4 shows a schematic drawing of the conductive metal ring in a second embodiment of the signal cable connection device incorporating teachings of the present disclosure.
Figure 5:
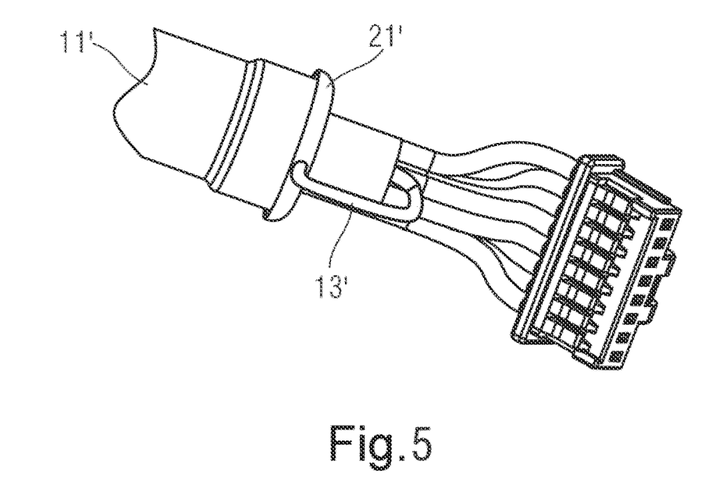
FIG. 5 shows a schematic drawing of an embodiment of an assembled state of the conductive metal ring in the second embodiment.

Now turning to FIGS. 4 and 5, these drawings show a second embodiment of the signal cable connection device incorporating teachings of the present disclosure. Compared with the first embodiment discussed above, the second embodiment is different mainly in terms of the design of the conductive metal ring; thus, the structure and effects of other components may be understood clearly by referring to the detailed description above in conjunction with FIGS. 1-3, and are not described again below.

In the second embodiment, the structure of the conductive metal ring 20' in the signal cable connection device is as shown in FIG. 4. It differs from the conductive metal ring 20 in the first embodiment in that: when assembly is carried out, the first end of the conductive metal ring 20' is inserted into the interior of the extremity of the sleeve 11', i.e. the first end of the conductive metal ring 20' is inserted between the extremity of the sleeve 11' and the loose wires therein, and at the same time the outward-turned flange 21' located at the second end of the conductive metal ring 20' abuts the extremity of the sleeve 11', as shown in FIG. 5. In some embodiments, as shown in FIG. 4, an inward-cut chamfer 22' may also be further provided at the first end of the conductive metal ring 20'; the chamfer 22' facilitates the insertion operation in the assembly step described above.

Similarly, a threaded hole may be likewise provided at an edge of the inner opening in the housing in this embodiment. When a screw is screwed into the threaded hole, the outward-turned flange 21' of the conductive metal ring 20' will be clamped between a head of the screw and a sidewall of the inner opening, thereby securely locking the conductive metal ring 20' in the cable channel of the housing.

In addition, in the second embodiment, the shielding wire 13' is welded to the outward-turned flange 21' of the conductive metal ring 20', to serve the function of blocking electromagnetic interference.

As discussed above, a signal cable connection device incorporating teachings of the present disclosure is adapted to be used for signal transmission of an electric machine and an encoder. In other words, in an electric machine assembly formed by an electric machine, encoder and signal cable, the electric machine and encoder are signal-connected via the signal cable. At least one end of the signal cable may employ the signal cable connection device so that the signal cable is connected to a signal interface on the encoder by means of the signal cable connection device, to increase the reliability of signal transmission.

In summary, compared with a signal cable connection device equipped with an aluminum foil shielding wire and a plastic cover in the prior art, the structure of the signal cable connection device of the present disclosure is simpler, and can at least dispense with the rubber sheath, ground terminal, plastic nut, and aluminum foil. In addition, the assembly steps of the signal cable connection devices described herein are fewer in number and easy to perform, hence assembly efficiency can be improved and the product cost can be lowered. In addition, the design, whereby the conductive metal ring and shielding wire are combined, may enhance the resistance to electromagnetic interference, so signal transmission is more reliable. The O-ring design can improve hermetic performance, to attain a higher grade of water resistance. The structure of the devices described in the present disclosure can avoid signal instability due to the cable or connection device being subjected to a force.

As will be obvious to those skilled in the art, various amendments and modifications could be made to the exemplary embodiments described above without departing from the spirit and scope of the present disclosure. Thus, it is intended that the present disclosure should cover amendments and modifications that fall within the scope of the attached claims and equivalent technical solutions thereof.

What is claimed is:

1. A signal cable connection device comprising:
   a cable including a sleeve and multiple loose wires enclosed in the sleeve, the multiple loose wires extending out from an extremity of the sleeve;
   a conductive metal ring crimped at the extremity of the sleeve so the conductive metal ring and the sleeve are fixed to each other, one end of the conductive metal ring having an outward-turned flange, and a shielding wire in the multiple loose wires connected to the conductive metal ring; and a housing with a cable channel allowing the cable to pass through, the cable channel defining an outer opening located at an outer side of the housing and an inner opening located at an inner side of the housing, and a threaded hole at an edge of the inner opening;

wherein, when a screw is screwed into the threaded hole, the outward-turned flange of the conductive metal ring is clamped between a head of the screw and a sidewall of the inner opening.

2. The signal cable connection device as claimed in claim 1, wherein respective extremities of the multiple loose wires are connected to a connector configured to be connected to an encoder.

3. The signal cable connection device as claimed in claim 1, wherein:

the conductive metal ring is fitted round the outside of the extremity of the sleeve and fixed thereto by crimping;

the conductive metal ring is fixed in a cable channel of the housing;

a first end of the conductive metal ring abuts the outer opening of the housing; and the outward-turned flange is located at a second end opposite the first end.

4. The signal cable connection device as claimed in claim 3, wherein a part of the shielding wire extends out from the extremity of the sleeve and is connected to an inner wall of the conductive metal ring by back-pressing.

5. The signal cable connection device as claimed in claim 3, further comprising an O-ring clamped between the outer opening of the housing and the first end of the conductive metal ring.

6. The signal cable connection device as claimed in claim 5, wherein the O-ring comprises an elastic material to improve sealing between the cable and the outer opening of the housing.

7. The signal cable connection device as claimed in claim 1, wherein:

a first end of the conductive metal ring is inserted into the extremity of the sleeve; and the outward-turned flange located at a second end of the conductive metal ring abuts the extremity of the sleeve.

8. The signal cable connection device as claimed in claim 7, further comprising an inward-cut chamfer at the first end of the conductive metal ring.

9. The signal cable connection device as claimed in claim 7, wherein the shielding wire is welded to the outward-turned flange of the conductive metal ring.

10. An electric machine assembly comprising:

an electric machine;

an encoder; and a signal cable;

wherein the electric machine and the encoder are signal-connected via the signal cable;

a signal cable connection device connecting the signal cable to a signal interface on the encoder, the signal cable connection device comprising:

a cable including a sleeve and multiple loose wires enclosed in the sleeve, the multiple loose wires extending out from an extremity of the sleeve;

a conductive metal ring crimped at the extremity of the sleeve so the conductive metal ring and the sleeve are fixed to each other, one end of the conductive metal ring having an outward-turned flange, and a shielding wire in the multiple loose wires connected to the conductive metal ring; and a housing with a cable channel allowing the cable to pass through, the cable channel defining an outer opening located at an outer side of the housing and an inner opening located at an inner side of the housing, and a threaded hole at an edge of the inner opening;

wherein, when a screw is screwed into the threaded hole, the outward-turned flange of the conductive metal ring is clamped between a head of the screw and a sidewall of the inner opening.

\* \* \* \* \*